Jan. 26, 1971  E. G. M. DYKEMAN  3,557,439
PALLET ASSEMBLING SYSTEM
Filed May 27, 1968  7 Sheets-Sheet 1
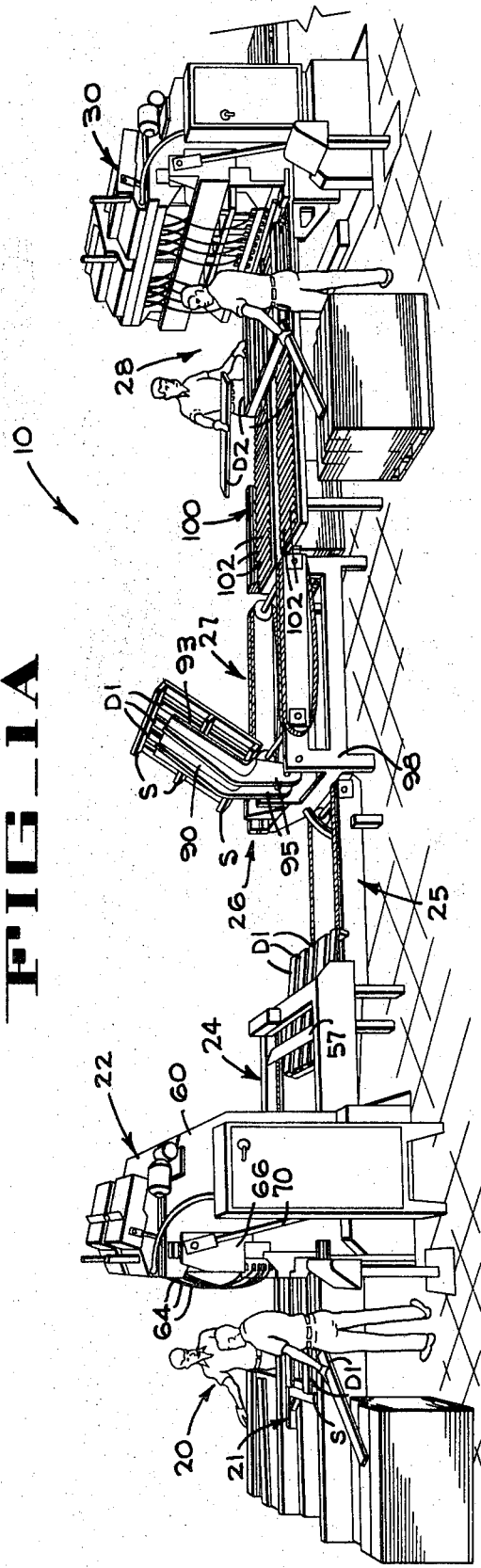
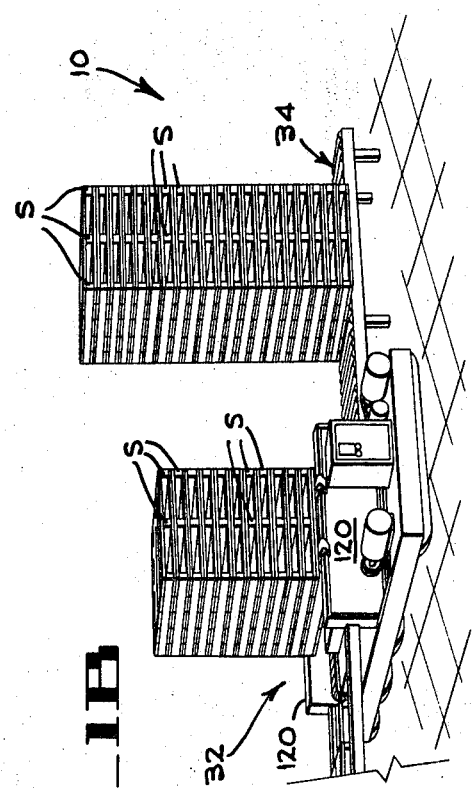
INVENTOR.
EDGAR G. M. DYKEMAN, DECEASED
BY KATHALEEN M. DYKEMAN, ADMINISTRATRIX
BY F. W. Anderson
C. E. Tripp
ATTORNEYS

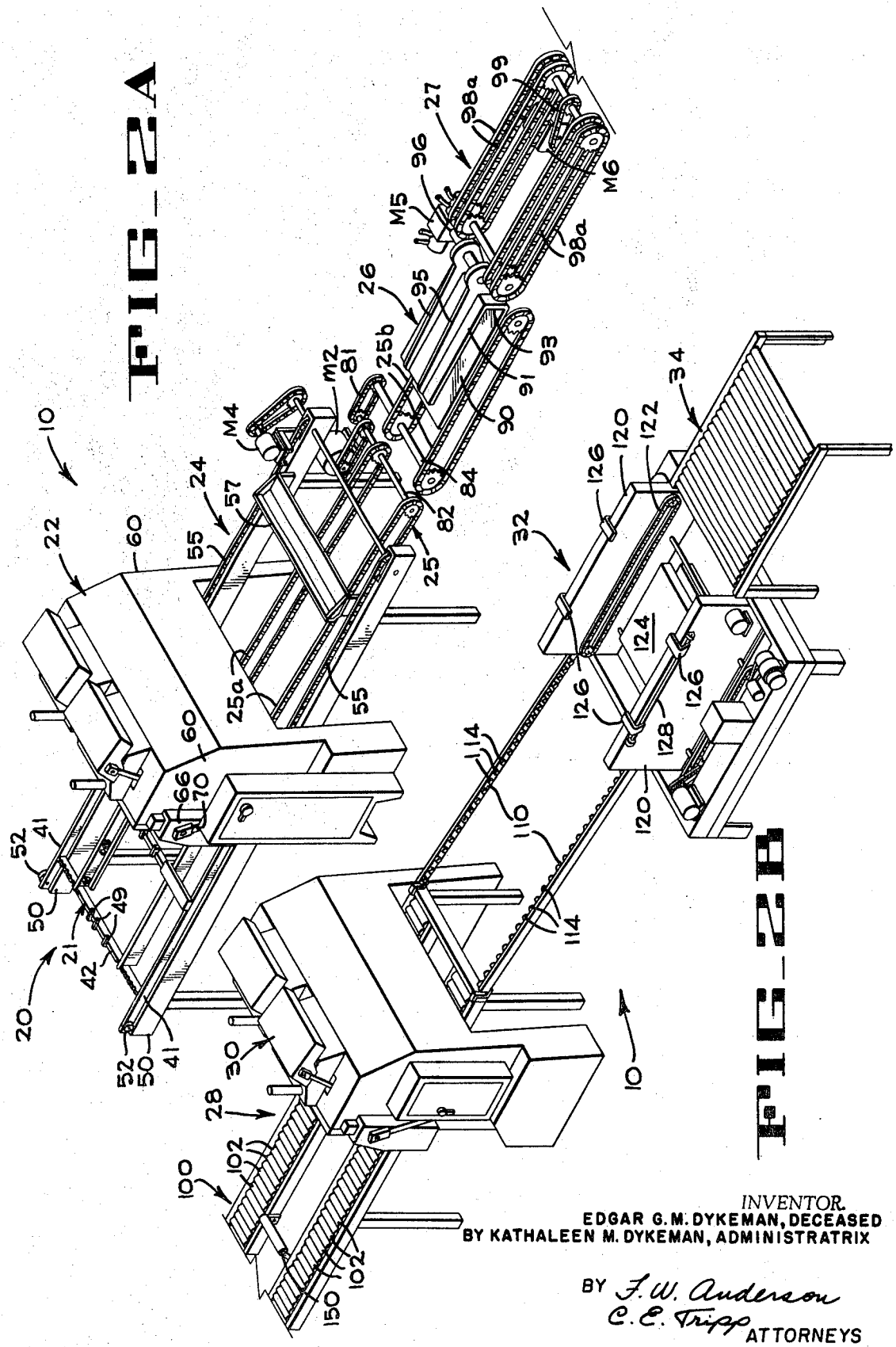

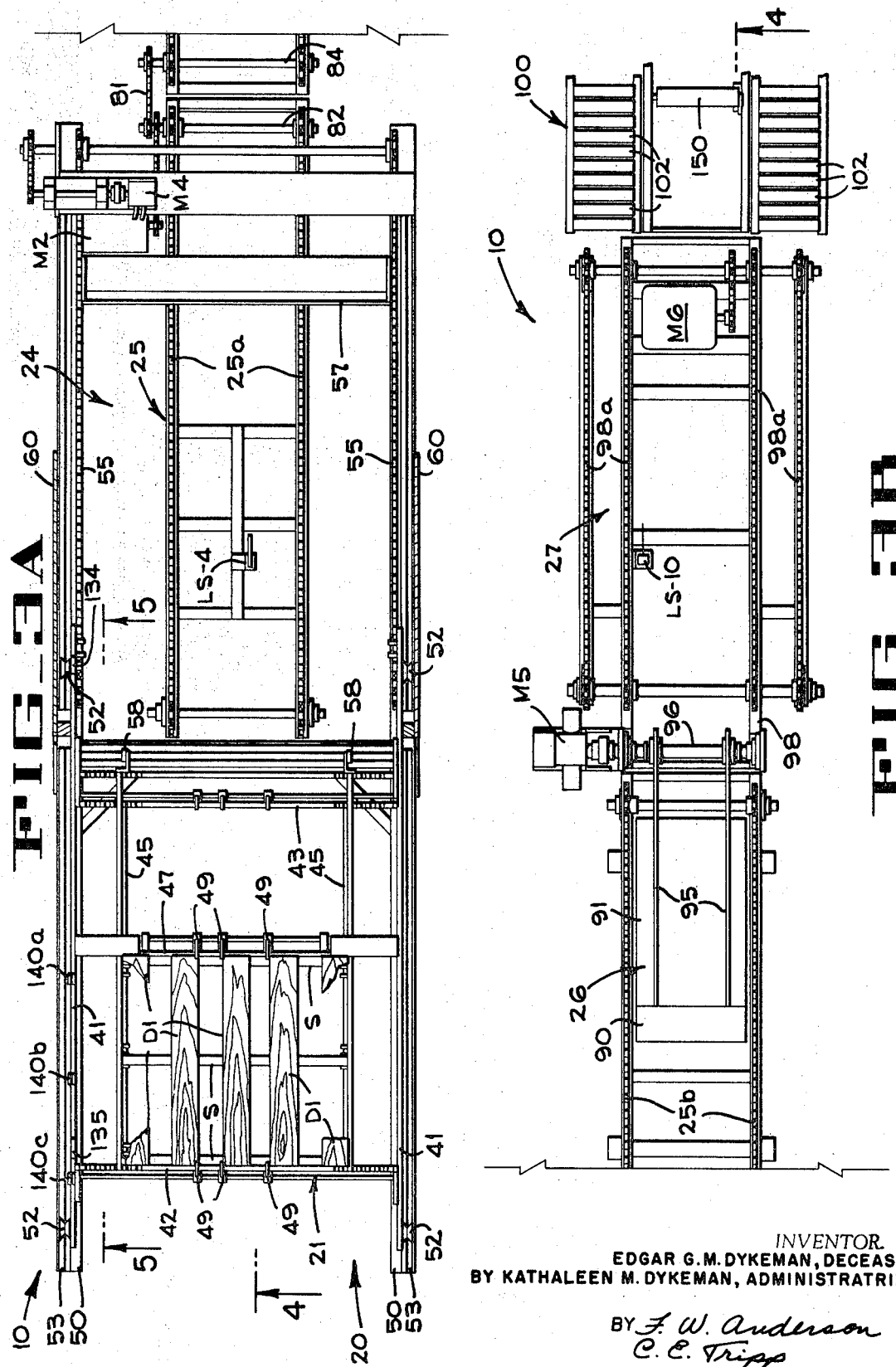

Jan. 26, 1971      E. G. M. DYKEMAN      3,557,439
PALLET ASSEMBLING SYSTEM
Filed May 27, 1968      7 Sheets-Sheet 4
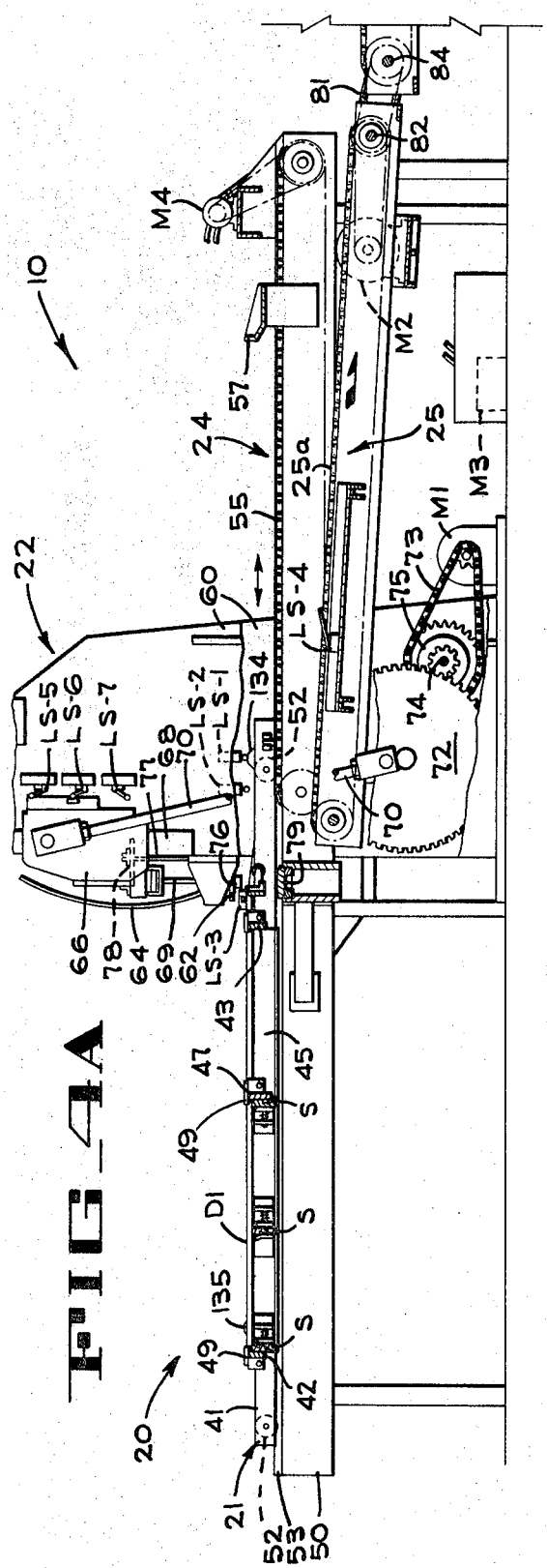
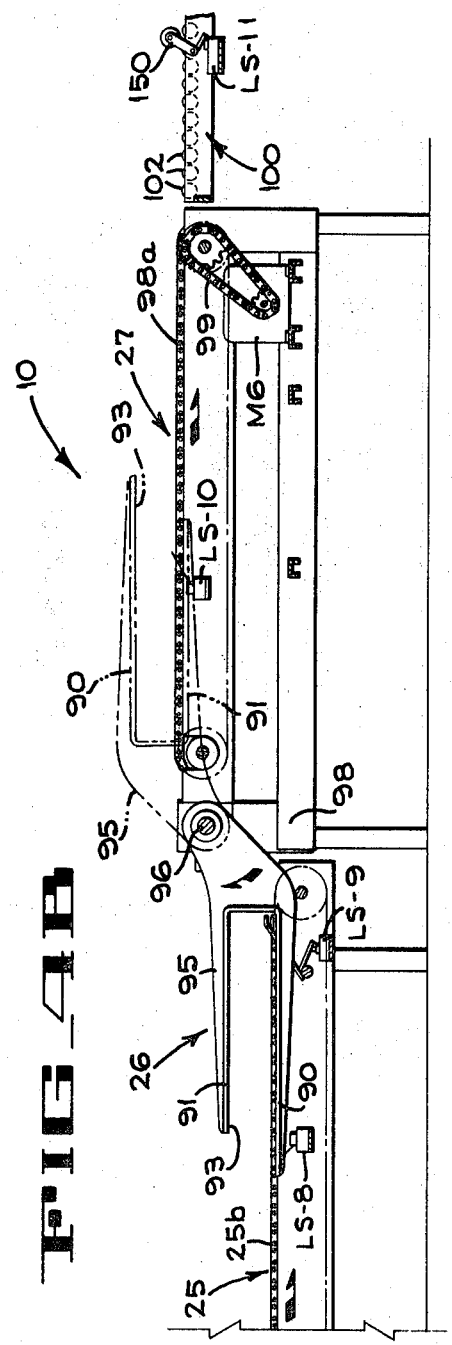
*INVENTOR.*
EDGAR G. M. DYKEMAN, DECEASED
BY KATHALEEN M. DYKEMAN, ADMINISTRATRIX
BY F. W. Anderson
C. E. Tripp
               ATTORNEYS Jan. 26, 1971 E. G. M. DYKEMAN 3,557,439
PALLET ASSEMBLING SYSTEM
Filed May 27, 1968 7 Sheets-Sheet 5
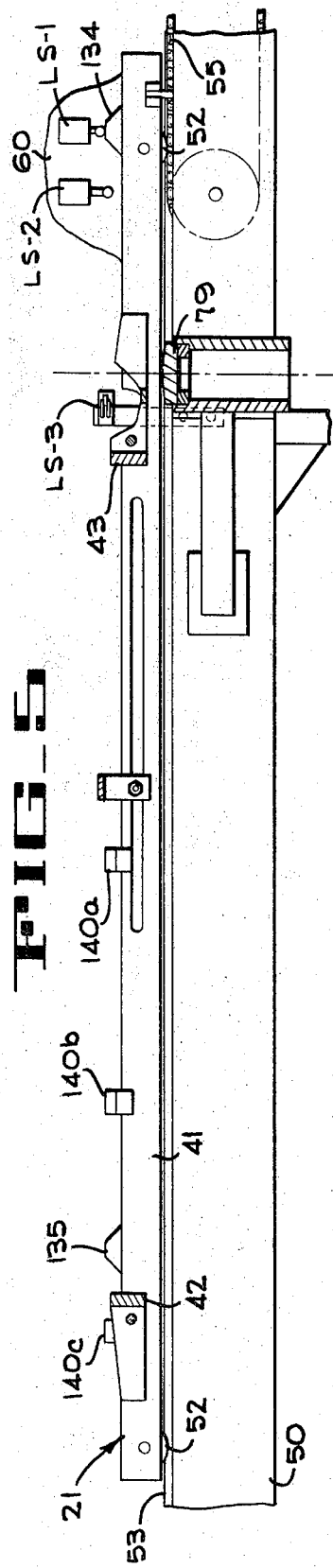
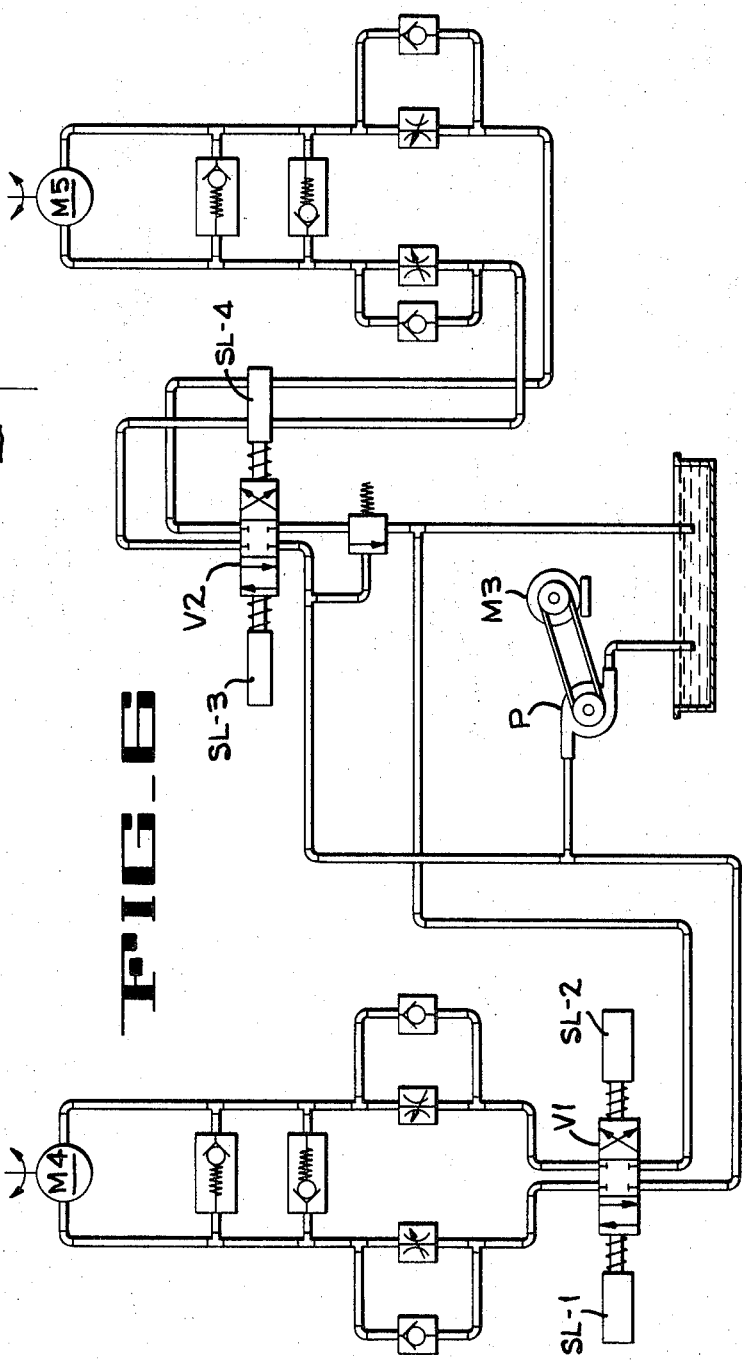
INVENTOR.
EDGAR G. M. DYKEMAN, DECEASED
BY KATHALEEN M. DYKEMAN, ADMINISTRATRIX
BY F. W. Anderson
C. E. Tripp
ATTORNEYS

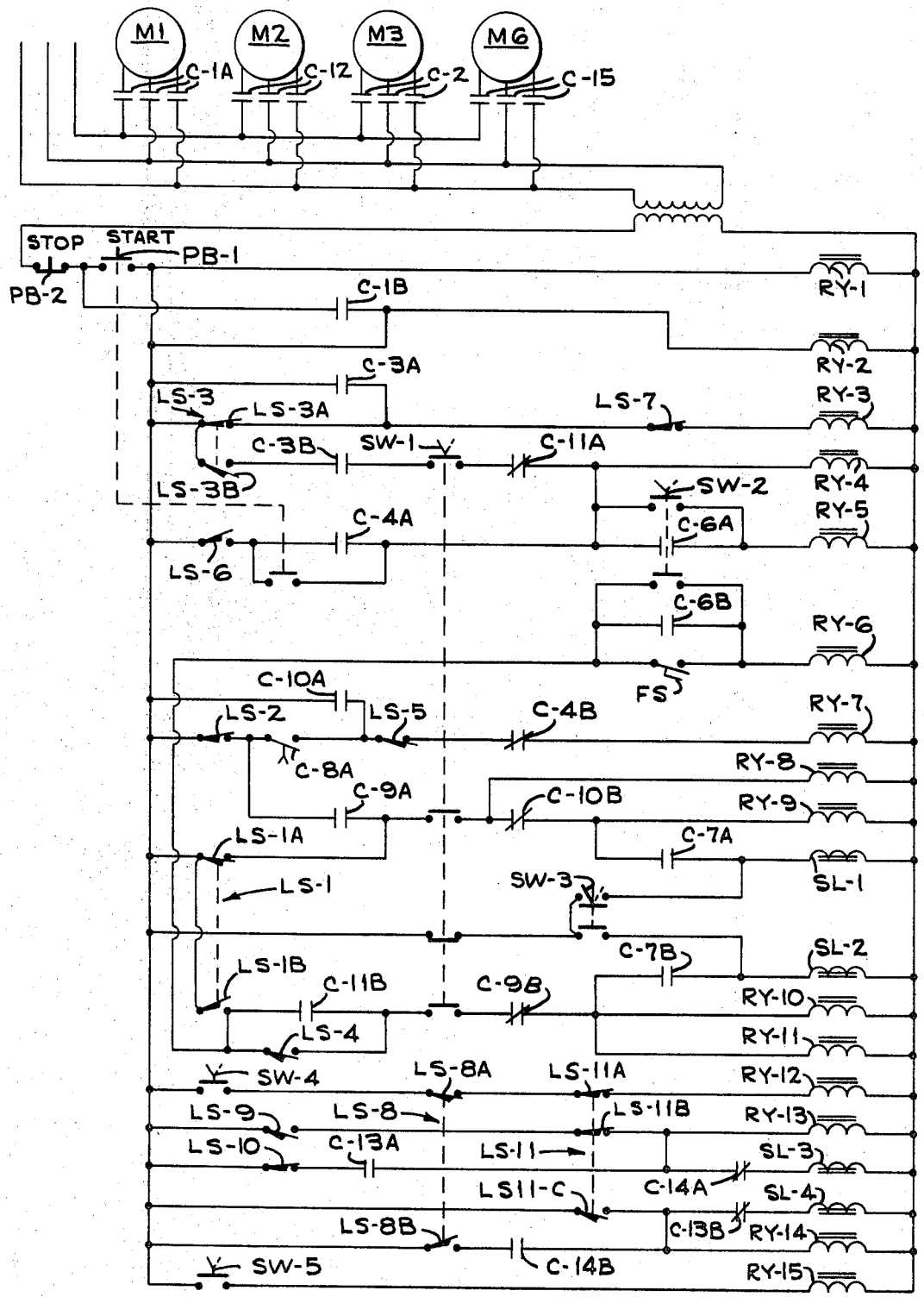
FIG_7

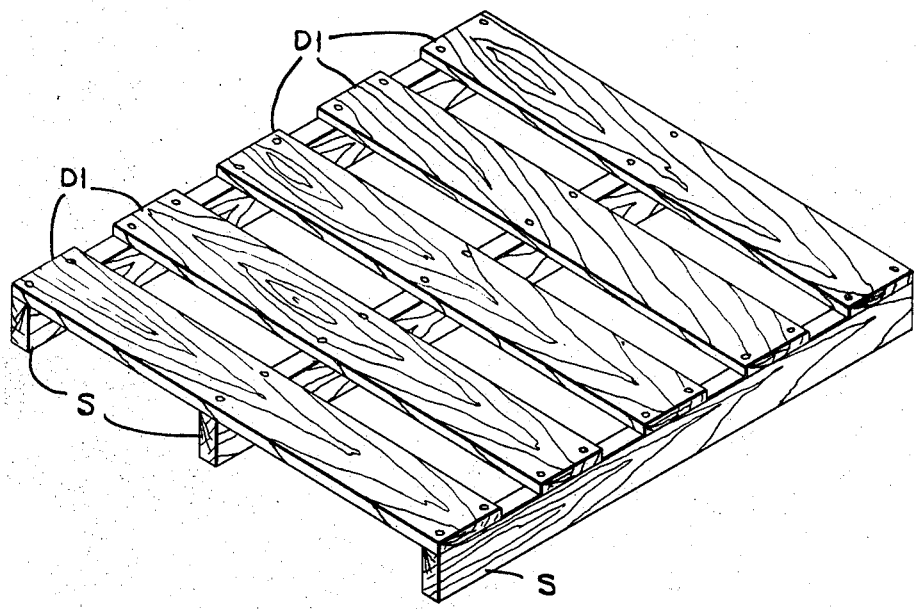
FIG_8
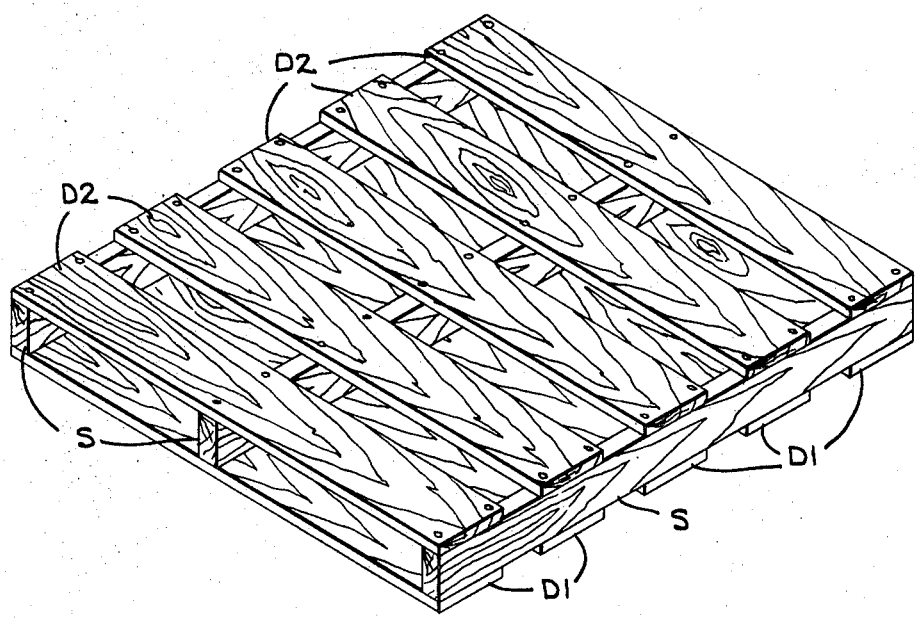
FIG_9

United States Patent Office 3,557,439
Patented Jan. 26, 1971

3,557,439
PALLET ASSEMBLING SYSTEM
Edgar G. M. Dykeman, deceased, late of Riverside, Calif., by Kathaleen M. Dykeman, administratrix, Riverside, Calif., assignor to FMC Corporation, San Jose, Calif., a corporation of Delaware
Filed May 27, 1968, Ser. No. 732,468
Int. Cl. B23p 19/00, 19/04
U.S. Cl. 29—430                                10 Claims

ABSTRACT OF THE DISCLOSURE

An assembly line for nailing wooden pallets which are formed by a plurality of deck boards placed crosswise to and on both sides of a plurality of spaced stringers. The assembly line includes a jig for positioning and holding the stringers and deck boards for one side of the pallet, a first automatic nailing machine, a pallet turnover device, a second nailing machine for nailing the deck boards to the other side of the pallet, a pallet stacking device, and various transfer conveyors for automatically conducting the pallet to and from the mentioned components of the assembly line in the order named.

A method of assembling a pallet is also disclosed comprising the steps of placing the stringers and a first set of deck boards in the assembly jig in the proper assembled relationship, running the jig beneath a first nailing machine, taking the thus assembled pallet and inverting it, placing a second set of deck boards upon the upturned unnailed surfaces of the stringers and conveying the pallet beneath a second nailing machine.

CROSS REFERENCE TO RELATED APPLICATIONS

The present application contains subject matter which was disclosed in my pending patent application, Ser. No. 674,860, filed Oct. 12, 1967 and entitled Pallet Stacking Apparatus, now Pat. No. 3,478,897, and in my pending patent application, Ser. No. 724,683 filed Apr. 24 1968 and entitled Assembly Jig for the Nailing of Wood Frame Members each of said applications being assigned to the assignee of the present application. The disclosures of both of these earlier filed applications are specifically incorporated by reference into the present disclosure for a further and more complete description of the specific details of the apparatus which is disclosed therein.

BACKGROUND OF THE INVENTION

Field of the invention

In general, this invention pertains to that field of art concerned with the methods of and the apparatus for assembling and nailing wood frame structures, and more particularly, it pertains to the assembling and nailing of wooden pallets which are comprised of a plurality of spaced stringer members interconnected on both their top and bottom edges by a plurality of deck boards that form support surfaces.

Description of the prior art

Wooden pallets, which are used to support stacked loads of goods, have become increasingly important to many phases of industry during recent years due to a general trend toward automated material handling systems to reduce the time consuming and costly manual labor involved in hand stacking and transporting operations. Although pallets may come in a variety of specific designs, they basically comprise a series of spaced stringers which are secured together in parallel relationship by a plurality of aligned deck boards running crosswise to both their top and bottom side edges. Due to the heavy demand for such structures, pallet manufacturers have long been seeking methods and means to efficiently increase their production rates without the addition of offsetting increased labor costs. These heavy labor costs are primarily due to the time and men needed in the assembly of and the nailing of the various components of the pallet.

Since pallets are simple structures and are subject to simple nailing techniques, the first step away from hand assembly and nailing operations was the introduction of nailing machinery wherein preassembled wooden pieces could be manually pushed or automatically conveyed through the machinery and automatically nailed at the required locations. In order to maintain the stringers and deck boards of the pallet in proper engagement for such nailing, special jigs were constructed for receiving and maintaining the individual wooden members, such jigs being capable of being pushed through a nailing machine by a single operator. The nailing machines and jigs in the more sophisticated plants were provided with various interengaging stops so that the jig would automatically position itself for proper nailing of the pallet members. For example, the patent to Cable 2,639,427 discloses such a nailing jig for the construction of pallets and illustrates its use with a common industrial type nailing machine. In more recent years, adjustable jigs have been proposed for use with automatic nailing machinery so that the same jig can handle different widths and lengths of pallets; the patent to Deamer et al. 2,958,351 discloses such a jig, for example. In addition to the adjustable feature, jigs have also been incorporated with conveying apparatus so that they can be automatically carried through the nailing machine. An example of an adjustable and automatically movable jig or fixture for pallets is shown in the prior patent to Stoddard et al. 3,207,403.

Although assembly jigs and automatic conveying apparatus have been used in conjunction with automatic nailing machinery to aid in the rapid construction of pallets, there are still problems presented which have not been successfully overcome. For example, a considerable amount of time and labor is still needed to both load the jig prior to the nailing operation and to unload the jig after the pallet has been nailed. Furthermore, in the most widely used form of pallets, both the top and bottom thereof are provided with deck boards to form stable support surfaces, and this construction requires a nailing operation on both sides of the pallet and thereby further increases the number of manual operations needed to load, unload and transfer the pallet between the various assembly jigs and nailing machine tables.

SUMMARY OF THE INVENTION

The present invention comprises a system for the assembly of and the nailing of wooden pallet structures. The system is designed to produce pallets of the common type having flat-faced deck boards nailed upon both the top and bottom surfaces thereof. The method and apparatus of the present invention, which comprises a highly efficient assembly line system, permit maximum production rates with a minimum use of costly manual labor.

Basically, the assembly system comprises two nailing machines, an automatically operated jig for assembling the individual wood members of the pallet, an automatically operated turnover device, and a plurality of various conveyors and conveyor sections, all of said items working in a continuous and coordinated cycle. An automatic pallet stacking device may also be used to receive and stack the finished pallets before their transportation to storage. The assembly jig is first loaded with the stringers and the overlying deck boards that comprise one side of the pallet and is then progressed automatically through a first nailing machine which nails the deck boards and stringers together. The partially finished pallet is then automatically discharged to a transfer conveyor which carries it to the automatic turnover device. This device flips the partially constructed pallet over so that the nailed deck boards are received face down and places it upon a second transfer conveyor in position to receive the second set of deck boards on the upstanding edges of the stringers. Once this second set of deck boards is positioned, the pallet is run through a second nailing machine, nailed, and discharged to the pallet stacking device. This latter device forms stacks of pallets of predetermined size and automatically discharges these stacks to a conveyor where they will await transfer to storage by a forklift truck or similar pickup vehicle.

The assembly line of the present invention has been used to produce up to four and more pallets per minute with but four men on the line. This has resulted in a dramatic increase in the production rate for pallet making in an industry which has historically been dependent upon the use of great amounts of manual labor. The efficiency provided by the system of the present invention results in a more uniform operation with fewer mistakes, and, therefore, a generally superior product is produced with fewer customer complaints.

BRIEF DESCRIPTION OF THE DRAWINGS

FIGS. 1A and 1B, when placed end-to-end, form an over-all perspective of the pallet assembling system of the present invention.

FIGS. 2A and 2B, when placed end-to-end, form an isometric, generally diagrammatic, view of the apparatus shown in FIGS. 1A and 1B, with portions of the frame and supporting structures being eliminated so as to show the interconnections and drives for the various conveying apparatus in the system.

FIGS. 3A and 3B, when placed end-to-end, form a plan of a portion of the apparatus shown in FIGS. 1A and 1B with the details of the nailing machine being eliminated.

FIGS. 4A and 4B, when placed end-to-end, form a longitudinal section through a portion of the apparatus of the present invention taken along the line 4—4 of FIGS. 3A and 3B, with the nailing machine being shown partially in side elevation.

FIG. 5 is an enlarged section taken along the line 5—5 of FIG. 3A particularly illustrating the switch actuating mechanisms for controlling the movement of the pallet assembling jig.

FIG. 6 is a schematic illustration of the hydraulic circuitry of the present invention.

FIG. 7 is a schematic illustration of the electrical circuitry of the present invention.

FIG. 8 is an isometric of a partially constructed pallet as it appears during an intermediate stage of the assembly operation of the present invention.

FIG. 9 is an isometric of a finished pallet after the completion of the assembly and nailing operation of the present invention.

DESCRIPTION OF THE PREFERRED EMBODIMENT

Referring first to FIGS. 1A and 1B, the pallet assembling apparatus 10 of the present invention is there shown in an operative arrangement for the continuous manufacture of wooden pallets of a type having a set of deck boards forming both the bottom and top surfaces thereof, such pallets being shown, for example, in FIG. 9. The pallet of FIG. 9 is seen to comprise a set of three spaced stringers S placed in a parallel relationship and joined together by a first series of five aligned deck boards D1 on one side thereof and a second series of five aligned deck boards D2 on the other side thereof.

In the arrangement shown in FIGURES 1A and 1B, an initial loading station 20 is provided wherein the stringers S and one set of deck boards D1 are loaded into an assembly jig or fixture 21 in the proper assembled relationship. As can be seen from FIGURE 1A, two men stationed at opposite sides of the jig can accomplish this loading operation. The loaded jig is adapted to be carried forwardly under a nailing machine 22 wherein the stringers and overlying deck boards are nailed together to provide a partially finished pallet structure, with one side only being nailed such as is shown in FIGURE 8. The jig then clears the nailing machine and reaches a discharge station 24 where the partially constructed pallet is dropped vertically to an underlying transfer conveyor 25. This conveyor carries the pallet to a turnover device 26 which is automatically operated to receive the pallet between its rearwardly projecting arms, flip the pallet over while carrying it forwardly, and deposit it upon an elevated, second transfer conveyor 27 which will carry it downstream to a second loading station 28. At the second loading station, two men are utilized to provide the second set of deck boards D2 on the upturned, unnailed side of the stringers. After the deck boards D2 have been placed in the proper positions, one of the loaders may push the pallet through a second nailing machine 30 to nail these deck boards to the stringers and thus complete the pallet. Upon discharge from the second nailing machine, the finished pallet will gravitate to a pallet stacking device 32 which operates to automatically place the incoming pallets in stacks of predetermined size. Upon the accumulation of a complete stack of pallets, the pallet stacking device is operable to automatically discharge the stack to a discharge conveyor 34 where it will await pick-up by fork lift truck or other loading apparatus for removal to storage or to a transport vehicle.

The assembly jig 21, into which the loose boards are placed at the loading station 20, comprises a rectangular frame structure including side frame members 41 rigidly interconnected by a rear cross frame member 42 and by a front cross frame member 43 (FIG. 3A). The cross frame members of the jig serve to mount a pair of pivotable stringer supporting members 45 which include inwardly projecting flanges adapted to underlie the end surfaces of and support the stringers S of the pallets, the supporting members being laterally adjustable upon the cross frame members and therefore adaptable to different sizes of pallets. A black bar 47 is slidably mounted on the side frame members so that it may be enabled, in conjunction with the rear cross frame member 42, to fix the width of the pallet as determined by the length of the deck boards D1. Once the stringers have been placed upon the stringer support members within specially arranged pockets, the loaders working alongside the apparatus will slide the deck boards over the top of the stringers. In order that the deck boards may be properly located upon the stringers, a plurality of adjustably mounted spacer members 49 are provided on both the rear cross frame member and the back bar, each spacer member being provided with an edge overlying the adjacent stringer to serve as a guide and abutment for the end edges of the deck boards.

The assembly jig 21 is mounted for movement over a longitudinally extending frame structure 50 by means of wheels 52 attached at the forward and rearward ends of the side frame members 41, the wheels being adapted to ride upon a set of parallel tracks 53 (FIG. 3A) extending along the top of the frame structure. The forward ends of each of the jig side frame members are connected to endless conveyor chains 55 which propel the jig along the tracks and beneath the nailing machine 22. Conveyor chains 55 are driven by a reversible hydraulic motor M4 located at the forward end of the frame structure. Appropriately located switches and switch actuaing mechanisms, to be explained in detail presently, are provided to stop the forward travel of the assembly jig when each of the stringers is located directly beneath the nailing machine structure so that the nails can be driven to fasten the overlying deck boards thereto. When the jig has passed completely through the nailing machine, the leading ends of the stringer support members are adapted to strike the inclined face of a cam member 57 to cause the stringer support members to pivot outwardly and thereby allow the partially constructed pallet to drop to the underlying conveyor 25. As seen in FIG. 3A, each of the leading ends of the stringer support members mount roller 58 which is offset inwardly from the axis of the support member so that the abutment with the cam face causes it to pivot downwardly and thereby pivot the stringer support member within its supports in the cross frame members of the jig.

For a further and more complete description of the structure and operation of the assembly jig, reference is herein made to my pending application Ser. No. 724,683, filed Apr. 24, 1967, and entitled Assembly Jig for the Nailing of Wood Frame Members.

The nailing machine 22 may be any conventional industrial nailer wherein the work piece to be nailed is conveyed horizontally through the machine and wherein a plurality of nailing heads are reciprocated vertically above the work piece in a parallel line, such as is shown in the patent to Richards 2,856,606, for example. The nailing machine, as best shown in FIG. 4A, generally comprises a pair of rigid side frame members 60 which straddle the jig and mount for vertical movement a plurality of nail holding chucks 62, each chuck being individually fed nails through tubes 64. The chucks (one only being shown in FIG. 4A) are adjustably positioned laterally across the machine so that an entire transversely extending line of nails can be driven at the same time. The nails are forced out of the chucks and through the wood members on the jig by a vertically reciprocating, nail driving head 66 which is slidably mounted upon track members 68 attached to the side frame members 60 (one track only being shown in FIG. 4A). The nailing head carries a plurality of rod like nail punches 69 which are each associated with a nail chuck and which reciprocate through the chuck to drive the nail therefrom. The nailing head is reciprocated vertically by means of a pivotally mounted drive arm 70 which is eccentrically mounted upon a large drive wheel 72 at the base of the machine. When it is desired to operate the nailing head, the drive wheel is rotated through one revolution by means of a continuously operating drive motor M1 and a drive chain 73 which powers a drive shaft 74 through a selectively energizable clutch mechanism 75. Each of the nail carrying chucks is supported upon a connecting bar 76 extending transversely across the machine, the connecting bar being also slidably supported upon the nailing machine frame members 60 in the manner of the nailing head 66. The chuck connecting bar is supported from the nailing head at each side of the machine by means of a pair of rods 77, the upper ends of which are slidably supported within the nailing head and include stop members 78. When the nailing head moves downwardly the chucks will be carried with it until they strike the top of the structure to be nailed. The nailing head then continues its downward travel carrying the nail punches 69 through the chucks to drive the nails. The distance which the chucks will travel is just enough to allow ample clearance for the members in the jig, and in practicing the invention, it is set at about ¾ inches. Before the wood members in the jig are nailed, the stringers S are cammed slightly out of their supported position upon the stringer support members by the inclined front face of a transversely extending anvil 79 located beneath the nail chucks and extending transversely between the side frame members 60 of the machine. During the nailing operation the stringer will thereby be resting directly on the top of the anvil. For a further description of the structure and operation of the nailing machine, reference is made to the hereinbefore mentioned patent to Richards 2,856,606.

The transfer conveyor 25 is seen to comprise two separate, but connected sections—a first parallel pair of endless conveyors 25a mounted in a downwardly inclined position at the discharge station 24 to catch the partially constructed pallet, and a second pair of parallel endless conveyors 25b horizontally positioned and extending downstream from the forward end of the conveyors 25a. The two conveyor sections 25a and 25b are interconnected by a short endless drive chain 81, and they are both arranged to be driven by means of a motor M2 located below the conveyor drive motor M4 (FIG. 4A). As best shown in the diagrammatic view of FIG. 2A, the motor M2 is arranged to rotate a driveshaft 82 which is in driving engagement with the forward ends of the conveyors 25a and the trailing end of the connecting chain 81, the leading end of which is drivingly engaged with a shaft 84 for driving the conveyors 25b.

The transfer conveyor 25 is arranged to be driven when a partially constructed pallet is received thereon to transfer it to the turnover device 26. This device is shown in full lines in FIG. 4B in its normal position ready for loading and is seen to comprise a yoke-like structure which includes a lower arm 90 extending between and slightly below the upper runs of the conveyors 25b and an upper arm 91, of a shorter length, spaced above said lower arm so as to define a pocket 93 therebetween for the reception of the pallet. Extending away from the pallet-receiving arms 90 and 91 are a pair of mounting arms 95 which rigidly secure the turnover device to a pivot shaft 96 that is rotatably mounted within the trailing end of a conveyor frame structure 98. The pivot shaft is connected to and driven by means of a reversible hydraulic motor M5 through an approximate half-turn or 180° of rotation, in a manner to be explained presently, to cause the turnover device to rotate from the full line to the phantom line position of FIG. 4B where it can discharge the pallet.

The conveyor frame structure 98 mounts the second transfer conveyor 27 in a horizontal position, said conveyor comprising two pairs of parallel endless conveyor chains 98a extending at an elevation higher than that of the conveyor chains 25b. As will be apparent from FIGS. 4A and 4B, the turnover device 26 is adapted to pick the partially constructed pallet from the first transfer conveyor and both elevate it and reverse its spatial position in placing it upon the second transfer conveyor which is arranged at essentially the same elevation as was the assembly jig 21 so that the reversed pallet will be at the proper elevation to be worked up by the loaders at the second loading station 28. The endless conveyor chains 98a comprising the second transfer conveyor are arranged to be driven by means of a motor M6 and drive chain 99. As shown in FIG. 4B in phantom lines, the discharge position of the turnover device is such that the short arm 91 will be below the upper run of the conveyor chains 98a and the deck boards D1 at the lower surface of the pallet will therefore be received upon the conveyor chains to be transported downstream.

Extending downstream from the forward end of the second transfer conveyor 27 at the loading station 28 is a conveyor table 100 comprised of a pair of spaced rows of freely rotatable rollers 102 forming a handling surface for the pallet. The table is arranged so as to extend beneath the second nailing machine 30. As the partially constructed pallet is driven off of the second transfer conveyor 27, it will be propelled onto the rollers 102 wherein operators standing at either side of the table (as shown in FIG. 1A) will take the second set of deck boards D2 and properly position them upon the upturned edges of the stringers. The loaded pallet then will be pushed forwardly beneath the nailing head of the nailing machine to finish the second side of the pallet. This machine may be of the same type as the aforedescribed nailing machine 22. Since no jig assembly is to be used in the second nailing operation, the stringers must be aligned beneath the nailing head by eye, or by automatically operated stops of conventional structure (not shown).

When the trailing stringer has been nailed in the machine 30, the forward or downstream edge of the completed pallet structure will be received over a pair of skids 110 which will cause the pallet to gravitate downwardly to the stacking device 32, as best shown in FIGURE 2B. The skids comprise a pair of rail members having a plurality of uniformly spaced and freely rotatable rollers 114 extending along their opposed faces for supporting the side edges of the pallet. The leading and lowermost ends of the skids are secured to the pallet stacking device 32 which is best shown in FIGURE 2B. This structure comprises a pair of laterally adjustable side frame sections 120 for receiving a pallet therebetween each section mounting one of the skids 110 and being provided with an endless conveyor 122 on its lower face for bringing the pallet into position to be stacked. Located between the side frame sections is a lift 124 which is operable to lift the pallet from off the conveyor chains 122 and carry it upwardly until it can be received upon the top edges of opposed pairs of supporting dogs 126 which project inwardly from the top edges of the side frame sections. Each set of dogs is mounted upon a pivot bar 128 which is adapted to rotate on its associated side frame structure so that the dogs can be cammed upwardly and outwardly by the edge of the upwardly moving pallet. When the lift is reversed the dogs will fall into the space between the deck boards D1 and D2 and thereby catch the pallet in an elevated position and prevent it from descending back to the conveyors 122. As shown in FIGURE 1B, a series of pallets can thus be stacked by the pallet stacking device. When it is desired to discharge such a stack of pallets, the dogs are locked in their outwardly projected position and the entire stack can be lowered to the conveyors 122 with the descending lift. The conveyors 122 then function to carry the stack out of the stacking device to the discharge conveyor 34. For a further description of the structure and operation of the pallet stacking device 32, reference is made to my pending application Ser. No. 674,860, filed Oct. 12, 1967, and entitled Pallet Stacking Apparatus.

The discharge conveyor 34 is a conventional roller conveyor which may be driven or undriven as desired. The stacks of pallets which are intermittently received thereon will rest on the rollers until they can be picked up by a fork lift truck or other handling apparatus for transportation to a storage area.

The method of the present invention can thus be seen to include the steps of placing the stringers S and a first set of deck boards D1 in the assembly jig in the proper assembled relationship, running the jig beneath the first nailing machine 22, taking the thus assembled pallet and inverting it, placing a second set of deck boards D2 upon the upturned unnailed surface of the stringers S, and conveying the pallet beneath a second nailing machine 30.

Before describing the automatic operation of the various components of the present invention, reference is made to the various switches and switch actuators which permit such automatic operation. Limit switches LS–1 and LS–2, best shown in FIGURE 5, are positioned on the nailing machine frame and function to stop the jig 21 at the loading station 20 and discharge station 24, respectively. These switches are arranged in positions to be contacted by actuator blocks 134 and 135 positioned respectively at the leading and trailing ends of one of the side frame members 41 of the jig. This same side frame member also carries a set of three nailing actuators 140a, 140b and 140c as shown in FIGURE 5, each having an upwardly projecting edge offset outwardly from the actuators 134 and 135. It will be noted that the nailing actuators 140 correspond in number to the stringers S and are each positioned rearwardly of a corresponding stringer on the jig by a distance equal to the horizontal distance between the nailing line at the center of the anvil 79 (shown in phantom line in FIGURE 5) and the location of a conveyor limit switch LS–3 adapted to be successively engaged by the actuators to stop the jig in the proper position for nailing each of the stringers. Another limit switch LS–4 is positioned between the inclined conveyors 25a of the first transfer conveyor in a position to be actuated by the pallet falling from the jig at the discharge station; this limit switch functions to signal the jig to return to the loading station.

A bank of three limit switches LS–5, LS–6 and LS–7 (FIG. 4A) are positioned upon the nailing machine structure in positions to be actuated by a portion of the reciprocating nailing head 66. When the nailing head is in the normal up position (as shown in FIG. 4A), switches LS–5 and LS–6 are actuated and the lowermost switch LS–7 is unactuated. When the nailing head moves down to drive a line of nails through the pallet structure, the top switches LS–5 and LS–6 will be deactuated, and the lowermost switch LS–7 will be actuated.

Referring now to FIGURE 4B, a limit switch LS–8 is positioned at the downstream end of the first transfer conveyor 25 between the conveyors 25b in a position to be actuated by the turnover device 26 when it is in its normal, rearward position awaiting the entry of a pallet. Also located at the downstream end of the transfer conveyor 25 is a limit switch LS–9 having an actuating arm projecting up adjacent to the turnover device and above the upper run of the conveyors 25b so as to be engaged by the leading end of a pallet that is completely received within the pocket 93 of the turnover device. Switch LS–9 functions to signal the drive motor M5 to rotate the turnover device to its discharging position. Positioned upon the second transfer conveyor 27 between the conveyors 98a is a limit switch LS–10 which is adapted to be actuated by the turnover device when it is in its discharging position (as shown by phantom lines in FIGURE 4B). This switch therefore functions to signal the drive motor M5 to stop the movement of the turnover device. Another limit switch LS–11 is positioned upon the conveyor table 100 between the sets of rollers 102 and is provided with an actuating arm 150 projecting up above the plane of the rollers. This switch is arranged to be engaged by the lower surface of the pallet after it has completely cleared the turnover device, the switch therefore serving to signal the turnover device to return to its loading position. Limit switch LS–11 also functions to de-activate the first transfer conveyor 25 to prevent pallets from being fed to the turnover device. Consequenly, if for any reason the operators at the second loading station are delayed in feeding the pallets through the second nailing machine, they can leave the pallet upon the actuating arm 150 at the entrance of the second loading station and thus prevent any further pallets from being fed through to them.

Having physically located the various switches and switch actuating elements, the operation of the apparatus of the present invention will now be described in connection with the schematic circuits of FIGS. 6 and 7. The numbers following the contacts C relate those contacts to the similar numbered relays RY whose energization determine the position of the contacts—the contacts being shown in their "normal" or unenergized condition. Initially, the start button PB–1 is pressed to energize relay RY–1 which closes the set of contacts C–1A to the motor M1. Relay RY–1 also closes contact C–1B to energize relay RY–2 and close the set of motor contacts C–2 to the motor M3. Thus, the nailing machine is ready to function and the circuitry for controlling the hydraulic motors M4 and M5 driving the assembly jig and the turnover device, respectively, is set to function. Next, toggle switch SW–1 is closed to precondition the various switching circuits, switch SW–4 is closed to energize the relay RY–12, and, if the turnover device is in its normal position closing the limit switch LS–8A, to thereby close contact C–12 to the drive motor M2 and thereby set in motion the first transfer conveyor 25. Finally, the toggle switch SW–5 is closed to energize relay RY–15 thereby closing contact C–15 to the motor M6 and setting in motion the second transfer conveyor 27.

Starting with the assembly jig 21 at the loading station, as shown in FIG. 4A for example, the normally closed portion LS–3A of switch LS–3 will be closed, the lowermost switch LS–7 on the nailing machine will be closed with the head in the upper position, and relay RY-3 will therefore be energized to close contacts C-3A and C-3B. With the normally open portion LS-3B of unactuated switch LS-3 being opened, there is no circuit to the relay RY-4 and this relay remains unenergized. Also, with the jig at the loading station, the switch actuator 134 will be in engagement with limit switch LS-1 and hence the normally closed portion LS-1B will be open to break the circuit to relays RY-10 and RY-11. A circuit is closed through the normally open contact LS-1A, which is now closed, to energize relay RY-8, and a circuit is closed through the normally closed contact C-10B to energize the relay RY-9. Contact C-9A thereby closes to maintain the circuit to the relays RY-8 and RY-9 after the jig moves out of the loading station and opens switch section LS-1A. Relay RY-8 closes time delay contact C-8A only after a predetermined period of time. This period of time will be utilized by the workmen positioned alongside the loading table to place the stringers S and deck boards D1 into their proper positions upon the jig.

After a time sufficient to load the jig, the time delay contact C-8A closes and this closes a circuit through the normally closed limit switch LS-2, the normally open safety switch LS-5, which is closed by the nailing head in its up position, and the normally closed contact C-4B to energize relay RY-7. Energization of relay RY-7 closes normally open contact C-7A to provide a circuit to the solenoid SL-1. As shown in the hydraulic circuit of FIG. 6, the solenoid SL-1 shifts the four-way control valve V1 to the right and out of its neutral blocking position to provide a hydraulic circuit to the hydraulic motor M4 and thereby drive the endless conveyors 55 to carry the jig forwardly toward the first nailing machine. As the jig leaves the loading station, switch portion LS-1A of limit switch LS-1 will open, but relays RY-8 and RY-9 will be maintained in energized conditions through the contact C-9A which had previously been closed and through the normally closed limit switch LS-2.

When the first conveyor switch actuator member 140a arrives at the conveyor switch LS-3, the normally closed portion LS-3A thereof will be opened and the normally open portion LS-3B thereof will be closed. This will permit relay RY-3 to remain energized and will also cause the energization of relay RY-4 through the now closed contact C-3B and the normally closed contact C-11A. Closing of relay RY-4 opens contact C-4B to break the circuit to the relay RY-7 thereby opening contact C-7A and breaking the circuit to the solenoid SL-1 operating the hydraulic motor M4 for the jig conveyors. Thus, the conveyors will stop in the proper position with the first of the stringers S of the pallet being located directly under the nailing head.

The operator now pushes a foot switch FS to close a circuit to the relay RY-6. This relay closes the holding contacts C-6A and C-6B and thereby permits operation of the nailing machine. Relay RY-5, which controls the operation of the nailing machine clutch 75, is energized through LS-3B, C-3B, C-11A and C-6A and the motor M1 is drivingly engaged with drive wheel 72 to impart downward movement to the nailing head 66. As the nailing head moves, the uppermost safety switch LS-5 will be deactuated and allowed to open. Downward movement of the nailing head also deactuates middle limit switch LS-6 and allows it to close. When the nailing head gets to the bottom of its stroke and drives the nails, the normally closed limit switch LS-7 will be opened to deenergize the relay RY-3. Relay RY-4 and clutch relay RY-5 will, however, remain energized through LS-6 and C-4A until the nailing head is returned to its uppermost position to again open switch LS-6. When this occurs, the circuit to relay RY-4 through the switch LS-6 and the contact C-4A will be broken, and the circuit to the clutch relay RY-5 will be broken to deenergize the clutch and stop the movement of the nailing head. With relay RY-4 unenergized, a circuit is now again completed to relay RY-7 through the normally closed limit switch LS-2, the closed time delay contact C-8A, the limit switch LS-5 closed by the nailing head, and the normally closed contact C-4B. Closing of relay RY-7 closes the contact C-7A to energize the solenoid SL-1 and thereby again energize the hydraulic motor M4 driving the conveyor chains 55. Consequently, the jig 21 is again carried forwardly until the second conveyor switch actuator 140b engages the conveyor switch LS-3 and the aforedescribed process is repeated.

The sequence involving the alternating actuation of the jig conveyor chains 55 and the nailing machine 22 is repeated for each of the switch actuators 140b and 140c after which the jig will clear the nailing machine structure with one side of the pallet having been completely nailed, i.e., with each of the three stringers S being nailed to the overlying set of deck boards D1. As the jig continues to move, the off-set rollers 58 at the leading ends of the stringer support assemblies 45 will strike the inclined face of the cam 57 to cause the stringer support assemblies to rotate outwardly and drop the partially constructed pallet to the underlying conveyor section 25a in the manner previously described. At this same time, the trailing switch actuator 135 will engage the limit switch LS-2 to break the circuit to the relay RY-7 and open contact C-7A to the solenoid SL-1 to stop the assembly jig conveyors. When the partially constructed pallet falls upon the underlying conveyor section, it will actuate and close the normally open limit switch LS-4 and complete a circuit to relays RY-10 and RY-11 through the normally closed contacts C-9B and the normally closed portion LS-1B of the limit switch LS-1. With relays RY-10 and RY-11 closed, the holding contact C-11B closes to maintain the circuit to these relays and the contact C-10A closes to maintain a circuit to relay RY-7. The actuation of relay RY-7 now operates to drive the conveyor in reverse since the contact C-7B will be closed to complete a circuit to the solenoid SL-2. As is evident from the hydraulic diagram of FIG. 6, the solenoid SL-2 pushes the hydraulic control valve VI to the left to reverse the flow through the hydraulic motor M4 and thereby reverse the direction of movement of the jig conveyors 55. The jig will now be propelled back to the loading station 20 to open the normally closed portion LS-1B of the limit switch LS-1 and open the circuit to relays RY-10 and RY-11 to stop the conveyors. RY-9 and RY-8 are immediately closed in the manner previously described and the loading operation is initiated again. Also as previously described, the jig will start forward after a predetermined period of time during which the loading operation will be accomplished.

A toggle switch SW-2 is provided to maintain a circuit to the relay RY-6 so that the foot switch FS will not have to be tripped at the start of each pallet nailing operation, if so desired. Also, a two-way toggle switch SW-3 is provided so that the jig conveyors can be moved in either the reverse or forward directions by the operator; it will be noted that SW-3 is only operable when SW-1 is unengaged and the aforedescribed automatic operating cricuitry is dead.

When the toggle switch SW-4 closed, with the turnover device 26 in its normal rearwardly projected position (as shown in FIG. 4B) to close the switch section LS-8A, and with no pallet being received upon the downstream limit switch LS-11 so as to maintain portion LS-11A in its normally closed position, a circuit will be provided to relay RY-12 to provide continuous driving power for the first transfer conveyor 25. The transfer conveyor will therefore bring the partially constructed pallet directly into the pocket 93 formed by the spaced arms 90 and 91 of the turnover device. When the pallet is completely reecived within the turnover device, its leading edge will strike the actuator for limit switch LS-9 to close the switch and thereby close a circuit through the normally closed switch portion LS-11B to the relay RY-13. Energization of relay RY–13 closes contact C–13A and provides a circuit to the solenoid SL–3 through the normally closed limit switch LS–10 and the normally closed contact C–14A. As shown in the hydraulic circuit diagram of FIG. 6, the solenoid SL–3 is provided to shift a four-way hydraulic control valve V2 to the right and thereby provide a circuit for the hydraulic motor M5 to rotate the drive shaft 96 in a clockwise direction (as viewed in FIG. 4B) and thereby lift the turnover device from its loading position. The energization of relay RY–13 also opens the contact C–13B in the line to the solenoid SL–4 on the other end of the hydraulic control valve V2 to prevent this valve from being shifted back during the initial part of the transfer operation.

As the turnover device is lifted off of the limit switch LS–8, the switch portion LS–8A will be opened to de-energize relay RY–12, open the contacts C–12, and stop the motor M2 driving the first transfer conveyor; therefore, no pallets can be fed into the turnover device while it is in motion to deposit a pallet upon the second transfer conveyor. Also, even though limit switch LS–9 is returned to its normally open position as soon as the turnover device lifts off, the circuit to relay RY–13 and solenoid SL–3 is maintained through the closed contacts C–13A and the normally closed limit switch LS–10.

When the turnover device has been rotated into its discharge position (as shown in phantom lines in FIG. 4B) the limit switch LS–10 will be opened to break the circuit to relay RY–13 and the solenoid SL–3 to thereby cause the control valve V2 to shift to its neutral blocking position (as shown in FIG. 6) to stop the hydraulic motor M5 and the turnover device. Since the second transfer conveyor 27 is being continuously driven by means of motor M6, the leading edge of the pallet will be gripped by the upper run of the conveyor chains 98a and will be carried out from between the arms of the turnover device. When the pallet is completely free of the turnover device it will engage the actuator 150 for limit switch LS–11 to open switch portions LS–11A and LS–11B preventing energization of relays RY–12 and RY–13 and it will close switch portion LS–11C to provide a circuit to the solenoid SL–4 through the normally closed contact C–13B. Solenoid SL–4, as shown in FIG. 6, will operate to shift the hydraulic control valve V2 to the left to thereby reverse the direction of flow through the hydraulic motor M5 and drive the shaft 96 in the counterclockwise direction thereby returning the turnover device from the discharge position to its loading position. The closing of switch portion LS–11C also provides a circuit for relay RY–14 to open contact C–14A to the solenoid SL–3 and to close contact C–14B. With the turnover device in motion, the switch portion LS–8B will be in its normally closed position and, therefore, a circuit will be maintained to the solenoid SL–4 and the relay RY–14 even though the previously received pallet may be removed from off of the switch actuator 150 for the limit switch LS–11. The circuits to solenoid SL–4 and relay RY–14 will be maintained until the turnover device is back into its normal loading position to open switch portion LS–8B. When this occurs, switch portion LS–8A is again closed and a circuit may now be provided to the relay RY–12 to energize the first transfer conveyor 25 and feed another pallet to the turnover device to repeat the aforedescribed process.

The operators at the second loading station 28, by allowing the pallets to back up upon the conveyor table 100 can prevent the further feed of pallets by keeping the switch actuator 150 down, as previously explained. Once they remove a partially constructed pallet from the switch actuator 150, the assembly line is again ready to function. The loaders at the second station provide the second set of deck boards D2 to the upstanding stringers in the aforedescribed manner, and they then feed the pallet to the second nailing machine 30 to complete the nailing operation. The operation of the second nailing machine 30 and the operation of the pallet stacking device 32 can be made completely independent of the operation of the aforedescribed components of the assembly line. The second nailing machine may be operated in a conventional manner, or as described in the patent to Richards 2,656,606. The pallet stacking device 32 operates automatically in the manner described in my previously mentioned pending patent application Ser. No. 674,860.

From the foregoing description it can be seen that an automated pallet manufacturing system of a high degree of efficiency is provided. This system has produced revolutionary changes in wooden pallet manufacturing and had ushered in an exciting new era for the pallet making industry. It can produce up to four or more pallets per minute with but four men on the assembly line, as shown in the illustration of FIGS. 1A and 1B, since the apparatus in the operative combination disclosed will facilitate the assembling of the pallet structure and limit considerably the number of manual operations required.

Although the best mode contemplated for carrying out the present invention has been herein shown and described, it will be apparent that modification and variaiton may be made without departing from what is regarded to be the subject matter of the invenion as set forth in the appended claims.

Having completed a detailed description of the invention so that those skilled in the art could practice the same, I claim:

1. A pallet assembling system for assembling a pallet comprised of a plurality of deck boards placed crosswise to and on both sides of a plurality of spaced parallel stringers, said system comprising a first nailing machine, a jig for feeding the assembled stringers and one set of deck boards of a pallet beneath said nailing machine and for discharging said pallet upon the completion of the nailing of said one set of deck boards to the stringers on one side thereof, a turnover device for reversing the orientation of the pallet by rotating it 180° about a horizontal transverse axis to place the unnailed side of the pallet face up, a first conveyor means for transferring said pallet from said first nailing machine to said turnover device, a second nailing machine for nailing a second set of deck boards to the upturned unnailed side of the stringers, and second conveyor means for transferring said pallet from said turnover device to said second nailing machine.

2. A pallet assembling system according to claim 1 wherein said jig is at a first elevation where it can be loaded, said first conveyor means being at a second elevation lower than said first elevation, and said second conveyor means being at an elevation approximately the same as said first elevation, said turnover device being operable to elevate said pallet from said second to said first elevation while reversing its orientation.

3. A pallet assembling system according to claim 2 wherein said jig is provided with means downstream of said first nailing machine for dropping said pallet vertically to said first conveyor means.

4. A pallet assembling system according to claim 2 wherein said system forms a straight line path for said pallet from said jig to said second nailing machine.

5. A pallet assembling system according to claim 1 including a pallet stacking device for receiving the pallets discharged from said second nailing machine and for forming stacks of pallets of a predetermined size, said stacking device being provided with means for automatically discharging said stacks of pallets when they reach said predetermined size.

6. A pallet assembling system according to claim 1 including control means for automatically positioning said jig beneath said first nailing machine in the proper longitudinal positions for nailing each of said stringers and for stopping the movement of said jig when said pallet is discharged, switch means on said first conveyor means for reversing the direction of movement of said jig to return it to the loading station at the upstream side of said first nailing machine.

7. A pallet assembling system according to claim 1 wherein said turnover device comprises a pair of arms having a pocket therebetween for the reception of said pallet, said turnover device being movable from a first position with said arms extending upstream to receive said pallet from said first conveyor means to a second position with said arms extending downstream to discharge said pallet to said second conveyor means.

8. A pallet assembling system according to claim 7 including control means for automatically operating said turnover device when said pallet is received within said pocket and for stopping the movement of said first conveyor means when said turnover device is moved out of said first position.

9. A pallet assembling system according to claim 8 including switch means positioned on said second conveyor means for actuation by said pallet after discharge from said turnover device for causing said turnover device to return to its said first position, said switch means being also operable to prevent the movement of said first conveyor means until said pallet has been removed from said switch means.

10. A method of assembling a pallet comprised of a plurality of deck boards placed crosswise to and on both sides of a plurality of spaced parallel stringers, said method including the steps of placing said stringers and one set of deck boards in an assembly jig in the proper assembled relationship with the deck boards overlying the stringers, running said jig beneath a first nailing machine to nail the deck boards to the upwardly projecting surfaces of each of said stringers, conveying said pallet in a straight line path from said first nailing machine to a second nailing machine while reversing its spatial position by rotating it through 180° about a horizontal transverse axis, placing the second set of deck boards upon the upturned unnailed surfaces of the stringers, and conveying said pallet beneath said second nailing machine to complete the construction of the pallet, said pallet progressing in a straight line flow path from the initial jig loading station througth said second nailing machine.

References Cited

UNITED STATES PATENTS

| | | | |
|---|---|---|---|
| 3,225,434 | 12/1965 | Van Der Lely et al. | 29—430 |
| 3,399,445 | 9/1968 | Carroll | 29—200A |
| 2,839,427 | 5/1953 | Cable | 227—150 |
| 2,856,606 | 10/1958 | Richards | 227—109 |
| 3,207,403 | 9/1965 | Stoddard et al. | 227—101 |

THOMAS H. EAGER, Primary Examiner

U.S. Cl. X.R.

29—200, 208

PO-1050
(5/69)

UNITED STATES PATENT OFFICE
CERTIFICATE OF CORRECTION

Patent No. 3,557,439          Dated August 11, 1971

Inventor(s) EDGAR G. M. DYKEMAN, DECEASED

It is certified that error appears in the above-identified pat(
and that said Letters Patent are hereby corrected as shown below:

Column 2, line 11, insert --automatic-- before "nailin(
Column 4, line 42, change "pallets" to --pallet--. Column
line 45, change "black" to --back--. Column 4, line 70, ch;
"actuaing" to --actuating--. Column 7, line 9, change
"lateraly" to --laterally--. Column 8, line 42, change
"Consequenly" to --Consequently--. Column 12, line 4, chan(
"2,656,606" to --2,856,606--. Column 14, line 13, change
"througth" to --through--.

Signed and sealed this 28th day of December 1971

(SEAL)
Attest:

EDWARD M. FLETCHER, JR.     ROBERT GOTTSCHALK
Attesting Officer            Acting Commissioner of Paten